United States Patent [19]
Ness

[11] 3,837,663
[45] Sept. 24, 1974

[54] SNOWMOBILE LOADING RAMP

[76] Inventor: Clemet M. Ness, Rt. 5, Bemidji, Minn. 56601

[22] Filed: May 1, 1970

[21] Appl. No.: 33,589

[52] U.S. Cl............... 280/8, 214/515, 280/32, 188/32
[51] Int. Cl............................................ B62b 13/18
[58] Field of Search............ 280/8, 32, 30; 214/515, 214/83.24; 188/32, 8; 180/5; 296/61; 14/72, 73

[56] References Cited
UNITED STATES PATENTS

| | | | |
|---|---|---|---|
| 430,426 | 6/1890 | Hammond | 280/32 X |
| 843,835 | 7/1906 | McGinnis | 280/32 |
| 861,785 | 7/1907 | Wilson | 188/32 X |
| 1,357,117 | 10/1920 | Rhodes | 280/8 |
| 1,459,080 | 6/1923 | Arnstein et al. | 280/32 |
| 2,656,942 | 10/1953 | Helms | 214/515 |
| 2,704,989 | 3/1955 | Konecny | 280/8 X |
| 3,046,031 | 7/1962 | Reynolds | 280/8 |
| 3,437,354 | 4/1969 | Hetteen | 280/8 |

Primary Examiner—Kenneth H. Betts
Attorney, Agent, or Firm—Clarence A. O'Brien; Harvey B. Jacobson

[57] ABSTRACT

An elongated ramp structure for use in loading a snowmobile on to an elevated vehicle load bed. The ramp is designed to be disposed in an inclined position with its lower end upon the ground and its upper end resting upon the rear of the associated load bed. The ramp includes opposite side support wheels at its upper or forward end and automatic chock structure disposed forward of the longitudinal center of the ramp and shiftable between a lowered position depressed below the upper surface of the ramp and an upper position projecting above the upper surface of the ramp. The chock structure is spring-biased to its upper position and includes a forwardly facing upstanding abutment surface disposed above the upper surface of the ramp when the chock structure is in its upper position. The chock structure is engageable by the front skis of a snowmobile being driven up the ramp and is depressed by the front skis of the snowmobile as the latter move over the chock structure. As the rear ends of the skis of the snowmobile pass forwardly of the chock structure, the latter is released for upward displacement to its upper position whereby rearward displacement of the snowmobile along the ramp is prevented by the forwardly facing abutment surface of the chock surface. After a snowmobile has been loaded upon the ramp, the rear end of the ramp is lifted above the ground with the ramp generally horizontally disposed and the front end thereof supported on the load bed by its supporting wheel structure for forward rolling movement into position fully overlying the associated load bed.

8 Claims, 6 Drawing Figures

Clemet M. Ness
INVENTOR

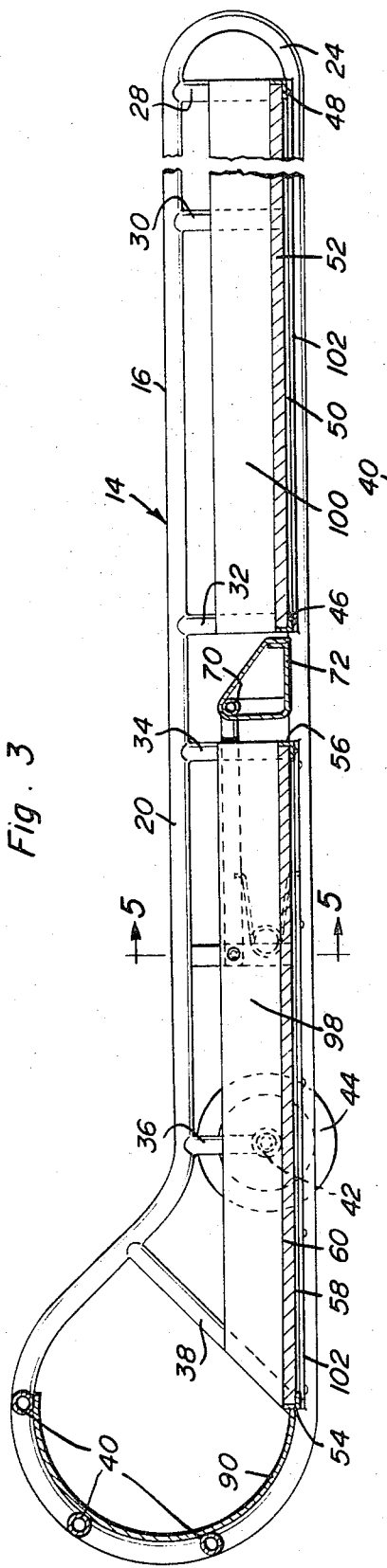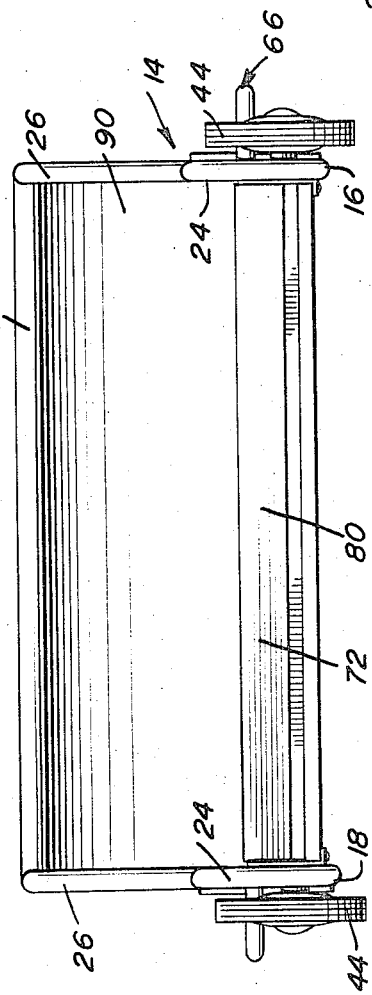

SNOWMOBILE LOADING RAMP

The snowmobile ramp of the instant invention has been designed to provide a means whereby a snowmobile may be readily loaded onto or unloaded from an elevated load bed such as the load bed of a pick up truck or the like. The loading ramp includes automatic chock structure for preventing undesirable rearward shifting of the snowmobile relative to the loading ramp when the rear end of the ramp is lowered to the ground and the front end of the ramp includes support wheel means whereby it may be rolled along the associated load bed.

In addition, the loading ramp is constructed in a manner whereby it defines a sled which may be utilized for emergency rescue purposes of injured or otherwise disabled persons and which may also be utilized as a support for carrying a disabled snowmobile over the snow with the sled being pulled by either persons afoot or another snowmobile.

The main object of this invention is to provide a loading ramp which may be utilized to load a snowmobile onto the vehicle load bed and also to unload a snowmobile from the vehicle load bed.

Another object of this invention, in accordance with the immediately preceding object is to provide a loading ramp including retractable chock means operative, when extended, to engage the rear ends of the skis of the snowmobile disposed on the ramp and prevent rearward shifting of the snowmobile relative to the ramp.

Still another object of this invention is to provide a chock structure in accordance with the immediately preceding object and constructed in a manner whereby the chock structure is automatically retracted upon forward movement of the snowmobile along the ramp and over the chock structure.

Another important object of this invention is to provide a loading ramp structure including supporting wheel means designed to assist in shifting the loading ramp, either with or without a snowmobile disposed thereon, longitudinally of an associated vehicle load bed.

A further object of this invention is to provide a loading ramp in accordance with the preceding objects and constructed enabling the ramp to be used as a substitute sled for rescuing disabled persons as well as disabled snowmobiles.

A final object of this invention to be specifically enumerated herein is to provide a snowmobile loading ramp in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is an enlarged fragmentary longitudinal vertical sectional view taken substantially upon the plane indicated by the section line 3—3 of FIG. 2;

FIG. 4 is a rear elevational view of the loading ramp;

FIG. 5 is a transverse vertical sectional view taken substantially upon the plane indicated by the section line 5—5 of FIG. 3.

Referring now more specifically to the drawings, the numeral 10 generally designates a conventional form of motor vehicles such as a pick up truck. The pick up truck 10 of course includes a load bed normally closed at its rear end by means of an end gate 12 and the end gate, when horizontally disposed, forms a rearward extension of the load bed.

Figure 1:
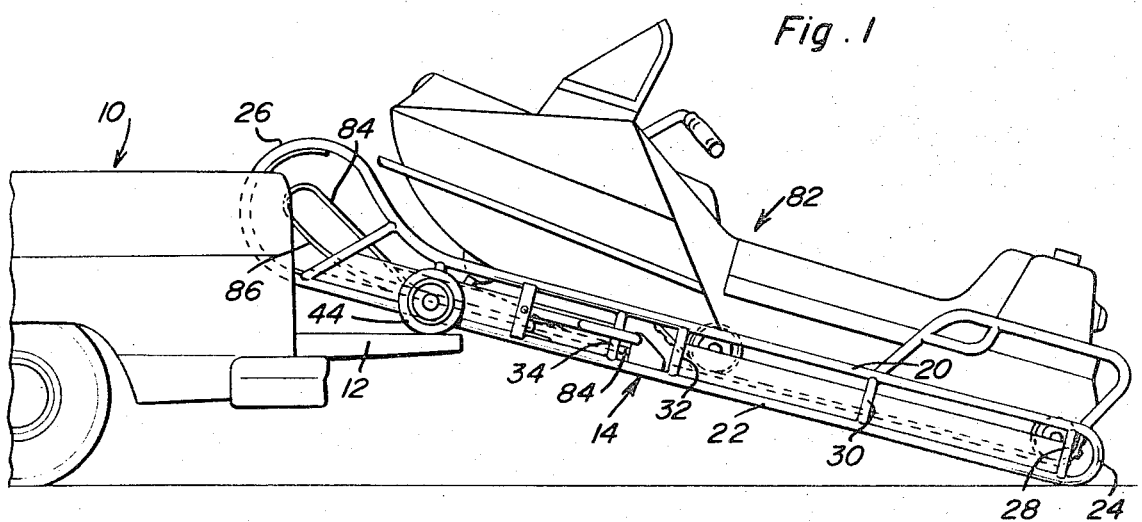
FIG. 1 is a side elevational view of the loading ramp in position with a snowmobile disposed thereon and in position to be moved up onto the rear end of the load bed of a vehicle upon which the forward upper end of the loading ramp rests.
Figure 2:
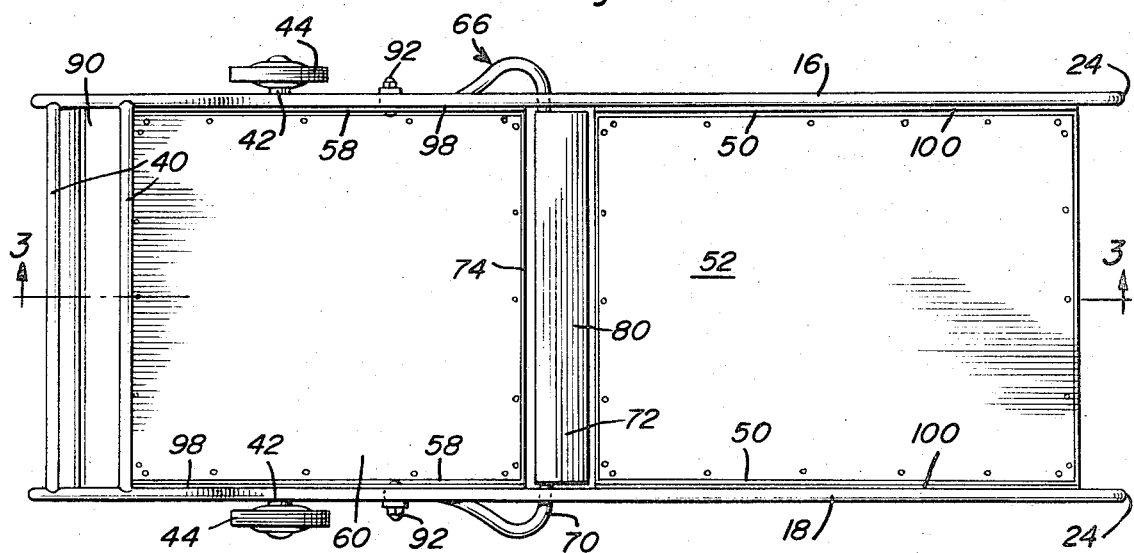
FIG. 2 is an enlarged top plan view of the loading ramp.

The loading ramp of the instant invention is referred to in general by the reference numeral 14 and is illustrated in FIG. 1 of the drawings with its forward end inclined upwardly and supported from the tail or end gate 12.

The ramp 14 includes a pair of opposite side longitudinal frames 16 and 18 and it may be seen from FIGS. 1 and 3 of the drawings that each of the frames 16 and 18 includes upper and lower vertically spaced apart frame members 20 and 22 joined at their rear ends by means of an integral semi-circular or U-shaped portion. Also, the front ends of the longitudinal members 20 and 22 are interconnected by means of a larger radius partial circular portion 26.

A plurality of longitudinally spaced vertical brace members 28, 30, 32, 34 and 36 are secured between each pair of longitudinal members 20 and 22 and a rearwardly and upwardly inclined forward brace 38 is secured between the forward ends of the longitudinal members 20 and 22.

The longitudinal frames 16 and 18 are joined by three similar tubular transverse braces 40 extending and secured therebetween and the lower end portions of each of the brace members 36 has an outwardly projecting stub axle 42 secured thereto upon which a support wheel 44 is journalled.

Rear transverse brace members 46 and 48 extend between the rear end portions of the longitudinal members 22 and a pair of opposite side brace members 50 extend along the rear ends of the longitudinal members 22. Corresponding ends of the brace members 50 are interconnected by means of the transverse brace members 46 and 48 and a plywood flooring section 52 is supported from the brace members 46, 48 and 50. In addition, a pair of front and rear transverse brace members 54 and 56 extend between the forward end portions of the longitudinal members 22 and a pair of opposite side brace members 58 extend along the forward ends of the longitudinal members 22. Corresponding ends of the longitudinal brace members 58 are interconnected by means of the transverse brace members 54 and 56 and a plywood flooring section 60 is secured to and supported from the brace members 54, 56 and 58.

It will be noted from FIG. 3 of the drawings that the rear marginal edge portion of the section 60 and the forward marginal edge portion of the section 52 are spaced apart longitudinally of the loading ramp 14 so as to define a slot between the sections 52 and 60 extending between the longitudinal frames 16 and 18.

Figure 6:
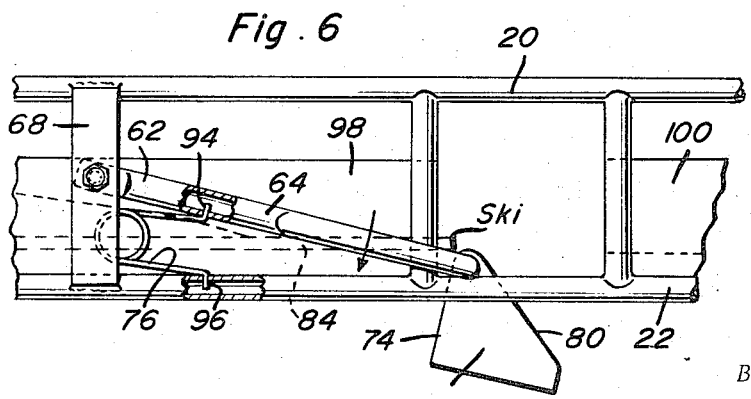
FIG. 6 is a fragmentary side elevational view of the central portion of the loading ramp and with the snowmobile ski chock structure disposed in a lowered and retracted position relative to the upper surface of the loading ramp.

The forward ends 62 of the leg 64 of a generally horizontal and forward opening U-shaped member referred to in general by the reference nemeral 66 are pivotally supported from additional vertical brace members 68 extending and secured between the longitudinal members 20 and 22. The brace members 68 are disposed between the brace members 34 and 36 and the bight portion 70 of the U-shaped member 66 extends and is secured through a transversely extending chock body 72 including a generally vertically disposed forward face 74. A pair of butterfly springs 76 are secured between the longitudinal members 22 and the legs 64 and yieldingly bias the U-shaped member 66 toward the uppermost position thereof illustrated in FIG. 3 of the drawings. However, by downward pressure being applied to the chock body 72, the latter may be downwardly displaced to the lowermost limit position thereof illustrated in FIG. 6 of the drawings with all portions of the chock body 72 recessed below the upper surfaces of the plywood flooring sections 52 and 60.

The chock body 72 includes a forwardly and upwardly inclined rear surface 80 defining a cam surface engageable by the front skis of a snowmobile, such as that generally referred to by the reference numeral 82. The front skis 84 of the snowmobile 82 curve upwardly as at 86 and the upwardly curving undersurface portions of the skis 84 ride up onto the cam surface 80 as the snowmobile 82 is advanced along the loading ramp 14 resulting in the cam block 72 being downwardly depressed to the position thereof illustrated in FIG. 6 of the drawings as the front skis 84 of the snowmobile 82 move over the slot defined between the plywood flooring sections 52 and 60. Of course, as the rear ends of the front skis 84 are advanced forwardly over the slot and onto the plywood flooring section 60, the chock block 72 is freed for upward movement behind the rear ends of the skis 84 thus preventing rearward movement of the snowmobile 82 on the ramp 14 as the operator of the snowmobile 82 turns off the engine of the snowmobile and dismounts from the latter preparatory to lifting up on the rear handle portions of the loading ramp 82 defined by the U-shaped portions 24. After the rear end of the ramp 14 has been raised to an elevation with the ramp 14 horizontally disposed, little forward thrust is required to roll the ramp 14 on its supporting wheels 44 forwardly along the load bed of the vehicle 10. As soon as the rear end portion of the loading ramp 14 has cleared the forward or lower marginal edge portion of the tail or end gate 12, forward movement of the loading ramp 14 may be terminated and the tail or end gate 12 may be pivoted to its upstanding closed position behind the rear end of the loading ramp 14. Of course, the process of unloading the snowmobile 82 from the vehicle 12 involves a substantial reversal of the immediately foregoing steps except that the opposite end portions of the bight portion 70 may be urged downwardly by foot pressure in order to manually depress and retract the chock block or body 72 preparatory to rearward movement of the snowmobile 82 off the ramp 14 after the ramp 14 has been positioned as illustrated in FIG. 1 of the drawings.

The front end of the ramp 14 includes a partial cylindrical shield or shroud 90 extending between the portions 26 and anchored to the transverse braces 40. In this manner, the loading ramp 14 may be utilized as a snow sled for carrying heavy loads across a snow covered surface.

Any suitable fasteners such as fasteners 92 are utilized to secure the free ends of the legs 64 of the U-shaped member 66 to the braces 68. In addition, the free ends of each spring 76 are anchored in bores 94 and 96 formed in the legs 64 and in the corresponding longitudinal members 22. Still further, each of the longitudinal frames 16 and 18 includes a pair of front and rear longitudinally spaced side panels 98 and 100. The panels 98 are secured along their upper marginal edge portions to the braces 34, 36 and 38 and the panels 100 are secured along their upper marginal edge portions to the braces 28, 30 and 32. In addition, the lower marginal edge portions of the panels 98 include inturned flanges 102 which are secured to the longitudinal members 22 and the lower marginal edge portions of the panels 100 include similar inturned flanges also secured to the longitudinal members 22. The members 50 and 58 are welded along flanges 102 and the members 46, 48, 54 and 56 are also welded to the flanges 102 and may be further secured to the latter by fasteners 104 also secured through the flooring sections 52 and 60. In addition, fasteners 106 are secured through the sections 52 and 60 and the members 46, 48, 54 and 56.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An elongated ramp defining generally straight flooring means, said ramp structure including front and rear end portions and adapted to be positioned with its forward end portion upwardly inclined and resting on an elevated load bed and its rear end portion resting upon a support structure disposed at a lower elevation than said load bed, said ramp front end portion including opposite side support wheels including lower marginal portions projecting only slightly below the underside of said flooring means, said wheels being spaced appreciably forward of the longitudinal center of said ramp, said flooring means including upper surface portions defining a load surface onto which a snowmobile may be driven, said lower marginal portions of said wheels being also only slightly spaced below said upper surface, the front end of said ramp structure including a transversely extending and forwardly and upwardly curving shield, said ramp structure rearward of said shield, including opposite side longitudinally extending runner defining members projecting slightly downwardly below the central undersurface portions of said ramp structure.

2. An elongated ramp structure including front and rear ends and adapted to be positioned with its forward end upwardly inclined and resting on an elevated load bed and its rear end resting upon a support structure disposed at a lower elevation than said load bed, said ramp including a transverse slot formed therethrough in a forward end portion thereof, a chock body supported from said ramp for up and down movement through said slot between an upper position projecting above the upper surface of said ramp structure and a lower position recessed below the upper surface of said ramp structure, means connected between said chock body and said ramp yieldingly urging said body toward said upper position, said chock body including a rearwardly and downwardly inclined upper surface comprising a cam surface engageable by the front skis of a snowmobile upon forward movement of the latter along said ramp structure for camming said chock body toward its lower position.

3. An elongated ramp structure including front and rear ends and adapted to be positioned with its forward end upwardly inclined and resting on an elevated load bed and its rear end resting upon a support structure disposed at a lower elevation than said load bed, said ramp including a transverse slot formed therethrough in a forward end portion thereof, a chock body supported from said ramp for up and down movement through said slot between an upper position projecting above the upper surface of said ramp structure and a lower position recessed below the upper surface of said ramp structure, means connected between said chock body and said ramp yieldingly urging said body toward said upper position, said chock body is supported from said ramp structure by means of a pair of opposite side trailing radius arms between whose rear ends said chock body is mounted and whose front ends are pivotally supported from said ramp structure for oscillation about horizontal transverse axes.

4. The combination of claim 3 wherein said chock body includes a rearwardly and downwardly inclined upper surface comprising a cam surface engageable by the front skis of a snowmobile upon forward movement of the latter along said ramp structure for camming said chock body toward its lower position.

5. An elongated ramp structure including front and rear ends and adapted to be positioned with its forward end upwardly inclined and resting on an elevated load bed and its rear end resting upon a support structure disposed at a lower elevation than said load bed, said ramp including a transverse slot formed therethrough in a forward end portion thereof, a chock body supported from said ramp for up and down movement through said slot between an upper position projecting above the upper surface of said ramp structure and a lower position recessed below the upper surface of said ramp structure, means connected between said chock body and said ramp yieldingly urging said body toward said upper position, the front end of said ramp structure including a transversely extending and forwardly and upwardly curving shield.

6. The combination of claim 5 wherein said ramp structure, rearward of said shield, includes opposite side longitudinally extending runner defining members projecting slightly downwardly below the central undersurface portions of said ramp structure.

7. The combination of claim 6 wherein the front end of said ramp includes opposite side support wheel means.

8. An elongated ramp structure including front and rear ends and adapted to be positioned with its forward end upwardly inclined and resting on an elevated load bed and its rear end resting upon a support structure disposed at a lower elevation than said load bed, said ramp including a transverse slot formed therethrough in a forward end portion thereof, a chock body supported from said ramp for up and down movement through said slot between an upper position projecting above the upper surface of said ramp structure and a lower position recessed below the upper surface of said ramp structure, means connected between said chock body and said ramp yieldingly urging said body toward said upper position, said ramp structure including forward end opposite side support wheels including lower marginal portions projecting only slightly below the underside of said ramp, said wheels being spaced forward of said slot and rearward of the forward end of the underside of said ramp.

* * * * *